[11] 3,597,680

[72] Inventor
[21] Appl. No.
[22] Filed Dec. 19, 1968
[45] Patented Aug. 3, 1971
[73] Assignee Aqua-Tronics, Inc.
Portland, Oreg.

[54] METHOD AND APPARATUS UTILIZING A TRANSMITTER AND RECEIVER FOR DETECTING THE PRESENCE OF A METALLIC OBJECT WITHIN A PIPE
3 Claims, 9 Drawing Figs.

[52] U.S. Cl. ........................................ 324/67, 324/3, 340/258 C
[51] Int. Cl. ...................................... G01v 3/08, G01v 3/12
[50] Field of Search............................ 324/34.1, 54, 67, 127, 3; 340/224, 258 C; 325/28, 67

[56] References Cited
UNITED STATES PATENTS

| | | | |
|---|---|---|---|
| 2,442,805 | 6/1948 | Gilson | 324/3 X |
| | | hweitzer | 324/127 X |
| | | ane et al. | 340/224 X |
| | | ell | 324/67 UX |
| 2,908,863 | 10/1959 | Neff | 324/67 |
| 2,940,302 | 6/1960 | Scherbatskoy | 324/34.1 |
| 3,328,789 | 6/1967 | Pacheco | 340/224 |
| 3,333,476 | 8/1967 | Hardy et al. | 325/67 UX |
| 3,467,855 | 9/1969 | Rance | 324/3 |
| 2,892,151 | 6/1959 | Bender | 324/3 X |

*Primary Examiner*—Gerard R. Strecker
*Attorney*—Kolisch & Hartwell

ABSTRACT: A method and apparatus for exploring an installed, concealed pipe to obtain information such as the location and coarse thereof, and the presence and position of a metallic object lodged therein. The method involves moving an electromagnetic wave transmitter through a pipe with the transmitter operating, and from a point outside the pipe receiving and interpreting the wave transmitted thereto by the transmitter.

PATENTED AUG 3 1971
3,597,680
SHEET 1 OF 2
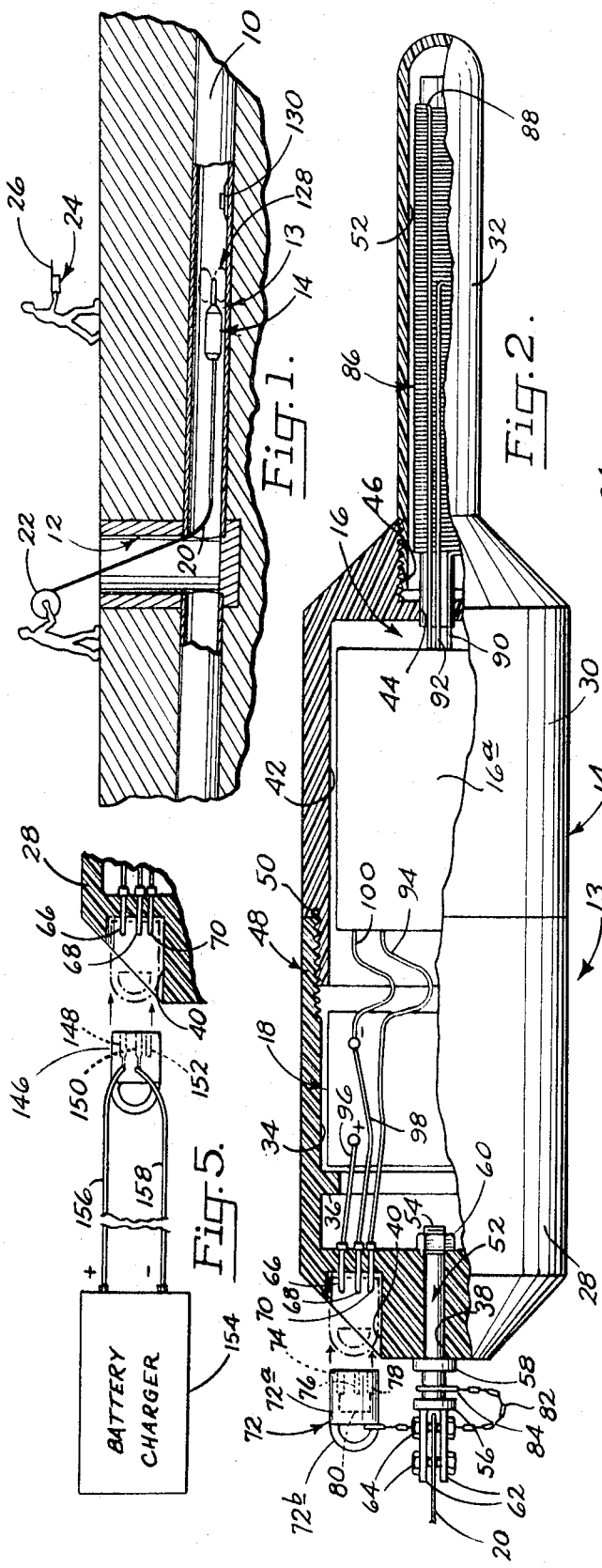
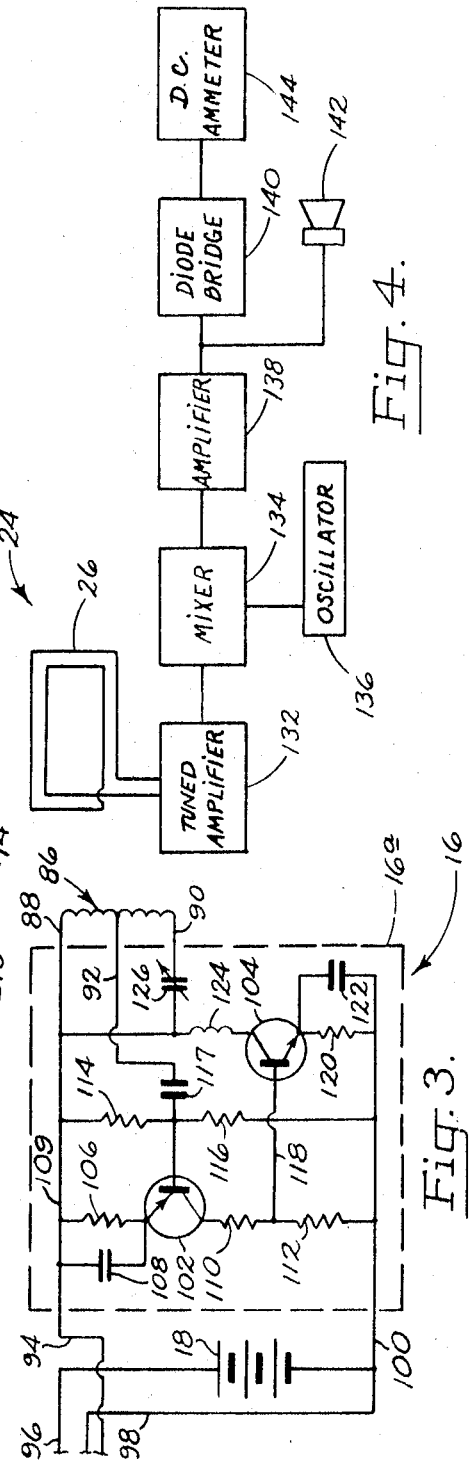
Merrill K. Haddon
INVENTOR
BY Kolisch + Hartwell
Attys.

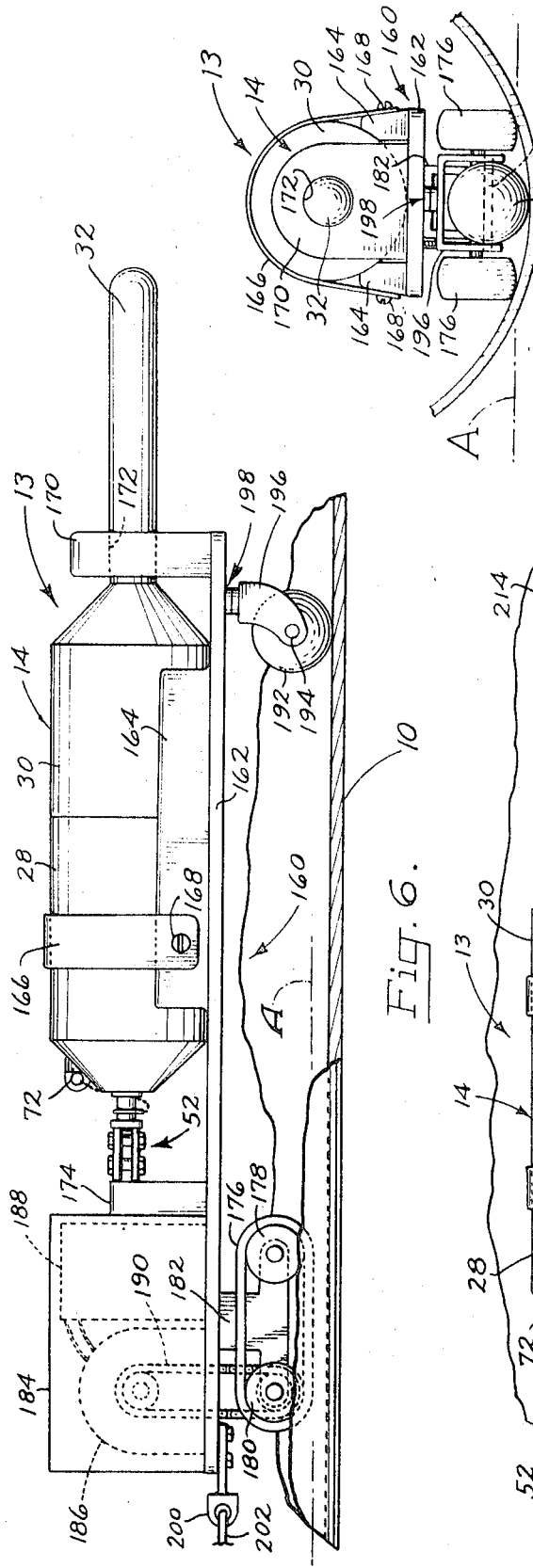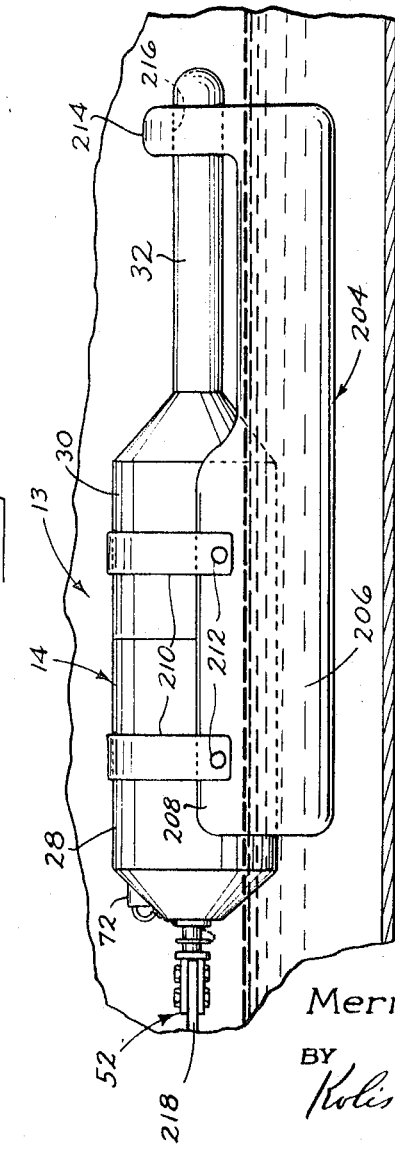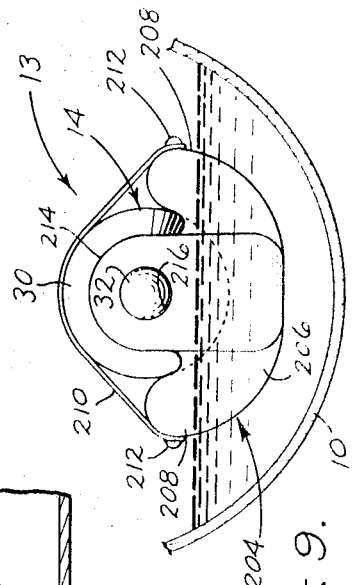

METHOD AND APPARATUS UTILIZING A TRANSMITTER AND RECEIVER FOR DETECTING THE PRESENCE OF A METALLIC OBJECT WITHIN A PIPE

This invention pertains to a method and apparatus for exploring an installed nonmetallic pipe to obtain certain information about the pipe. For the purpose of illustration only, and not with any intention to limit other applications of the invention, the same is described herein in conjunction with exploring an underground sewer.

Frequently it is desirable to obtain certain information about an installed nonmetallic pipe. For example, in the case of an underground pipe such as a sewer, one might wish to determine as accurately as possible the location and course of the sewer in order to avoid damage thereto during the course of a nearby construction project. In addition, in an installation like a sewer system where a router or other metallic cleaning device is sent periodically through a pipe, one might wish to determine whether and where a part of such a device has become detached and lodged in the pipe.

A general object of the present invention is to provide a novel method and apparatus for obtaining information of the type indicated above.

More specifically, an object of the invention is to provide such a method and apparatus which can be used to determine the location and course of a nonmetallic pipe, and further to determine the presence and position of a metallic object lodged within such a pipe.

In its preferred form, the invention contemplates a novel transmitter which is adapted to be inserted within a pipe. When so inserted, and when energized, the transmitter is operable to transmit a periodic electromagnetic wave to a region outside the pipe. The proposed transmitter includes novel frequency-varying means whose proximity to a metallic object inside the pipe is effective to change the frequency of a transmitted wave. The frequency-varying means contemplated herein takes the form of a coil which is so constructed that its inductance depends significantly upon the coil's proximity to a metallic object inside the pipe. A metallic object outside the pipe, however, has little or no effect on the coil's inductance.

The invention also contemplates a receiver adapted to receive a wave transmitted to the outside of a pipe. The proposed receiver includes a source which produces another wave having a substantially fixed frequency, and indicating means operable to indicate a change in the frequency of a transmitted wave through comparing the frequencies of the two waves. The receiver further includes a directional antenna which facilitates determining the position of the transmitter in a pipe.

According to a preferred manner of practicing the invention, the transmitter, while operating, is advanced along the inside of a pipe. The receiver is utilized outside the pipe to follow and determine the location of the transmitter, and also to indicate any change which may occur in the frequency of the transmitted wave. In this fashion, the location and course of a pipe, and the presence and position of a metallic object therein, are easily determined.

Yet another object of the invention is to provide a novel housing for containing the proposed transmitter, which housing is adapted also to contain a battery for energizing the transmitter. With such construction, it is not necessary that electrical power cables extend from a point outside a pipe to the transmitter located within the pipe.

Still another object of the invention is to provide novel positioning means for adjusting the position of the transmitter a pipe. According to the invention, several modifications of such positioning means are proposed, with each constructed to take care of a different condition inside a pipe.

These and other objects and advantages attained by the invention will become more fully apparent as the description which follows is read in conjunction with the accompanying drawings, wherein:

FIG. 1 is a simplified fragmentary view generally illustrating apparatus constructed according to the invention, and how such apparatus may be employed to explore an underground sewer;

FIG. 2 is an enlarged view illustrating a probe forming part of the apparatus shown in FIG. 1, with a housing in the probe partly broken away to illustrate a battery and transmitter contained therein;

FIG. 3 is a schematic diagram of the transmitter shown in FIG. 2;

FIG. 4 is a simplified block diagram illustrating a receiver employed in the apparatus of FIG. 1;

FIG. 5 illustrates how a battery charger may be employed to charge the battery shown in FIG. 2;

FIG. 6 is a fragmentary side elevation illustrating a power-driven carriage employed under certain circumstances to support the probe of FIG. 2 for movement in a pipe;

FIG. 7 is a view taken from the right side of FIG. 6;

FIG. 8 is a fragmentary side elevation illustrating a flotation unit employed under certain conditions to support the probe of FIG. 2 for movement in a pipe; and FIG. 9 is a view taken from the right side of FIG. 8.

Turning now to the drawings, and referring first to FIG. 1, indicated generally at 10 is an underground sewer or pipe. Sewer 10 is typical of the kind located below the surface of a street, and is constructed of a nonmetallic material such as concrete. The sewer has a circular cross-sectional configuration, and may have an inside diameter of about 6 inches and a wall thickness of about 1½ inches. Sewer 10 is accessible from the surface of the ground through a conventional manhole structure 12, the top of which has been opened up in FIG. 1 to provide access to the sewer.

Indicated generally at 13 within the sewer is a movable probe constructed according to the invention. Probe 13 includes a housing 14, and mounted within the housing (see FIG. 2) a transmitter 16 and a battery 18 for energizing the transmitter. Attached to the left or rear end of housing 14 in FIG. 1, in a fashion which will be more fully described, is one end of an elongated tape 20. Tape 20 extends from housing 14 through sewer 10 and manhole structure 12 to a suitable takeup device, such as reel 22, located above the ground. Reel 22 may be operated manually to take up and pay out the tape.

Further describing tape 20, it may be constructed of a suitable resilient material such as spring steel, which possesses a certain amount of stiffness. On being payed out, the tape moves probe 13 to the right along the sewer in FIG. 1, and on being taken up, it shifts the probe to the left in FIG. 1. Tape 20 constitutes one form of positioning means, as contemplated by the invention, for adjusting the position of probe 13, and hence of transmitter 16, within the sewer. Tape 20 can be used for this purpose under substantially all conditions which may exist within sewer 10.

Indicated generally at 24 in FIG. 1, above the ground, is a portable receiver as contemplated herein, including a directional antenna 26. Receiver 24 is constructed to receive a wave transmitted by transmitter 16. A suitable portable electrical power source (not shown) is provided for energizing the receiver.

Considering in greater detail the construction of housing 14 in the probe, and referring to FIG. 2, the housing comprises three generally cylindrical sections including a rear section 28, a medial section 30, and a front section 32. The housing sections preferably are constructed of a nonabsorbent, abrasion-resistant plastic, such as the produce known as "DELRIN" manufactured by E. I. duPont de Nemours and Co. Sections 28, 30 are similar in outside appearance, and have substantially the same outside diameters (preferably about 2 inches). The ends of sections 28, 30 which are spaced apart from one another in FIG. 2 are generally conically shaped. Section 32 has an outside diameter preferably of about three-fourths inch, and has a dome-shaped forward end.

Extending axially into the right end of rear section 28 in FIG. 2 is a cylindrical well 34 on the inside wall surface of which is formed an annular rib 36. A bore 38 extends axially from the left end of well 34 and opens to the left end of section 28. Also opening to the left end of section 28 is a cylindrical socket 40.

Extending axially into the left end of medial section 30 in FIG. 2 is a cylindrical well 42. The right end of the medial section is provided with a pair of aligned axial bores 44, 46, with bore 44 opening to the right end of well 42, and bore 46 opening to the right end of section 30. Sections 28, 30 are screwed together as indicated at 48, with the joint between the two sections sealed by a sealing ring 50.

Front section 32 in the housing includes an elongated axial bore 52 which opens to the left end of the section in FIG. 2. The left end of section 32 is screwed into bore 46 in section 30 as shown. Sections 30, 32 are sealed together through a layer (not shown) of a suitable spreadable sealing material applied to the screw threads joining the two sections.

Mounted within bore 38 in rear section 28 in a lug 52. The lug includes an elongated shaft 54 which extends through the bore, and formed integrally with the shaft, a pair of axially spaced annular flanges 56, 58 disposed outwardly of section 28. The part of shaft 54 which extends through bore 38 is sealed to the wall thereof through a sealing material similar to that provided between housing sections 30, 32. Flange 58 seats against the left end of section 28, and the lug is anchored in place by means of a nut 60 screwed onto the right end of shaft 54. Joined to and extending from the left side of flange 56 in FIG. 2 are vertically spaced leaves 62 which receive between them the right end of previously mentioned tape 20 in FIG. 2. The tape is detachably secured to the leaves through fasteners 64.

Also mounted on rear section 28 are electrical connector pins 66, 68, 70. The pins extend axially through the material forming the left end of section 28, with the left ends of the pins exposed in socket 40, and the right ends of the pins exposed adjacent the left end of well 34. The pins are sealed to housing section 28 through a sealing material like that mentioned above. Pin 68 is disposed intermediate pins 66, 70, and in a position which is closer to pin 70 than to pin 66.

Indicated generally at 72 in FIG. 2 is a plug including a cylindrical body 72a adapted to be received within socket 40, and a pull 70b formed on the left end of body 72a in FIG. 2. The plug may be formed of the same material used for housing sections 28, 30, 32. Mounted within body 72a are three socket-type electrical terminals 74, 76, 78 positioned to receive pins 66, 68, 70, respectively, upon insertion of body 72a in socket 40. Also mounted within body 72a is a jumper conductor 80 which connects terminals 74, 78. With pins 66, 68, 70 and terminals 74, 76, 78 positioned as described proper mating of the pins and terminals is assured. Plug 72 is retained closely adjacent housing 14 through a keeper including a chain 82 having one end attached to pull 72b, and the other end mounted on shaft 54 through a collar 84 which rides on the shaft in the region between flanges 56, 58.

Still referring to FIG. 2, transmitter 16 is mounted inside housing 14 with components (represented by a block 16a) contained within well 42, and an elongated cylindrical coil, or inductive agency, 86 contained within bore 52. As will be more fully described, conductors 88, 90, 92 are provided which interconnect coil 86 and certain other components in the transmitter represented by block 16a. Conductors 88, 90 are connected to opposite ends of the coil, and conductor 92 is connected to a point on the coil intermediate the ends. A conductor 94 interconnects transmitter 16 and pin 70.

Battery 8 comprises a conventional rechargeable battery which is suitably mounted within well 34 in housing section 28, with the battery seated against rib 36. The positive and negative terminals of the battery are connected to pins 66, 68, respectively, through conductors 96, 98, respectively. A conductor 100 interconnects the negative terminal of the battery and transmitter 16. A sufficient amount of slack is provided in conductors 94, 100 to permit separation of housing sections 28, 30 to provide access to the battery and transmitter.

Considering in detail the construction of transmitter 16, and referring particularly to FIG. 3, the transmitter includes a pair of transistors 102, 104. Transistor 102 functions as part of a feedback amplifier in the transmitter, and transistor 104 functions as part of an oscillator in the transmitter.

The emitter of transistor 102 is connected through the parallel combination of a resistor 106 and a capacitor 108 to a conductor 109 which interconnects previously mentioned conductors 88, 94. The collector of transistor 102 is connected to conductor 100 through series resistors 110, 112. The transistor's base is connected to conductor 109 through a resistor 114, and to conductor 100 through a resistor 116. The base is also connected to previously mentioned conductor 92 through a coupling capacitor 117.

Transistor 104 has its base connected to the junction between resistors 110, 112 through a conductor 118. The emitter of transistor 104 is connected to conductor 100 through a resistor 120 and a capacitor 122 which are in parallel. The transistor's collector is connected to conductor 109 through a coil 124, and to previously mentioned conductor 90 through coil 124 and a variable capacitor 126.

In the preferred embodiment illustrated herein, transmitter 16 when energized produces a substantially constant-amplitude, periodic, electromagnetic wave, normally having a frequency of about 118 kilocycles. Thus, the transmitter is referred to herein as a source of electromagnetic energy. The value of this frequency is determined principally by the inductance of coil 86 and the capacitance of capacitor 126. A wave thus produced radiates (i.e., propagates) from coil 86, and may be received in a region remote from the transmitter—for example, in a region above the ground in FIG. 1.

In addition, with the transmitter energized, coil 86 produces a magnetic field which surrounds the coil. Referring particularly to FIG. 1, an important feature of the invention is that coil 86 is so sized that the magnetic field which it produces contains a major part (about 80 per cent) of its stored energy within a relatively small zone immediately adjacent the coil. This zone, which preferably has a radial extent from the axis of coil 86 of about 2 inches, is illustrated generally at 128 by dashed lines in FIG. 1. Those skilled in the art will recognize that the extent of zone 128 is determined primarily by the diameter of coil 86. They will further recognize that to obtain a zone of a given extent, containing a given major portion of stored field energy, one can readily, through known calculations, determine the proper coil diameter required. To produce a zone, such as zone 128 described above, coil 86 is constructed to have a diameter of about three-eighths inch. It will be noted that zone 128 does not extend outwardly beyond the wall of sewer 10.

Another phenomenon known to those skilled in the art is that the inductance of coil 86 depends significantly upon the magnetic permeability of the media within zone 128, and depends little upon the permeability of the media outside the zone. Also known is that many metallic objects, particularly those containing iron, have permeabilities which are considerably higher than those of most other materials. As a consequence, transmitter 16 can be employed effectively to indicate the presence of such a metallic object inside sewer 10, while ignoring the presence of a metallic object outside the sewer.

More specifically, on moving probe 13 along sewer 10, the inductance of coil 86 (and hence the frequency of the wave produced by transmitter 16) will change significantly upon the coil moving past a metallic object, such as router head 130 in FIG. 1, lodged inside the sewer. This is because such an object will come within zone 128. In particular, the change in the coil's inductance will cause the frequency of the transmitted wave to drop. The inductance of the coil, however, will not change appreciably upon the coil traveling past a metallic object which is located outside the sewer, since such an object will not come within zone 128. Thus, coil 86 is also referred to herein as a frequency-varying means.

Referring now to FIG. 4, and considering generally the construction of receiver 24, antenna 26 preferably is planar in construction, and has a rectangular outline as shown. The antenna is connected to the input of a tuned amplifier 132, whose output is connected to one input of a mixer 134. Feeding another input in the mixer is an oscillator, or source, 136. The output of mixer 136 is connected to the input of an audio amplifier 138, the output of which is connected, in turn, to a diode bridge 140, and a loudspeaker 142. A DC ammeter 144 is connected to bridge 140. The specific circuits employed in each of the components of receiver 24 represented by blocks in FIG. 4 are not described herein, since such components may be of conventional construction.

Considering how the various components in the receiver perform, amplifier 132 is constructed to amplify signals having frequencies in the range of about 117 to 119 kilocycles. Oscillator 136 produces a substantially constant-amplitude output signal, or wave, having a fixed frequency of about 59.25 kilocycles. Mixer 134 is constructed to compare the second harmonic frequency, (118.5 kilocycles) of the output signal of oscillator 136, and the output signal fed to the mixer from amplifier 132. The mixer supplies amplifier 138 with a signal having a frequency which is equal to the difference between 118.5 kilocycles and the frequency of the signal supplied by amplifier 132. As an illustration, with transmitter 16 transmitting to the receiver a wave having a frequency of 118 kilocycles, mixer 136 supplies amplifier 138 with a signal having a frequency of about 500 cycles per second. It will be noted that this frequency is within the audio range. Loudspeaker 142 produces a tone whose frequency follows that of the output signal of amplifier 138.

Diode bridge 140 rectifies the output signal of amplifier 138, and furnishes ammeter 144 with a DC current whose amplitude generally follows the amplitude of such output signal. As a consequence, with the amplitude of the signal produced by oscillator 136 remaining substantially constant, as mentioned above, the amplitude of the DC current fed ammeter 144 generally follows the amplitude of the output signal produced by amplifier 132. And it will be noted that the amplitude of this output signal depends upon the amplitude of the signal developed in antenna 26. Since the antenna has a directional characteristic, the amplitude of the latter-mentioned signal depends largely on the disposition of the antenna relative to transmitter 16.

Referring now to FIGS. 2 and 3, to energize transmitter 16, plug body 72a is inserted in socket 40, with terminals 74, 76, 78 receiving pins 66, 68, 70, respectively. With the body inserted, conductors 94, 96 become connected through jumper conductor 80, whereupon power is supplied the transmitter from battery 18. Thus, it is obviously a relatively simple matter to energize and deenergize the transmitter without having to open up housing 14.

Considering FIGS. 2, 3 and 5, to recharge battery 18 periodically, a plug shown in FIG. 5 at 146 is provided which is adapted to be inserted in socket 40. Plug 146 is similar in appearance to plug 72, and includes socket-type electrical terminals 148, 150, 152 which are adapted to receive and make electrical contact with pins 66, 68, 70, respectively, with the plug inserted in socket 40. Terminals 148, 150 are connected to the positive and negative terminals, respectively, of a conventional battery charger 154 through conductors 156, 158, respectively. With plug 146 inserted in socket 40, and battery charger 154 operating, charging current is supplied battery 18 through conductors 96, 98 inside the housing. Thus, recharging of battery 18 is a relatively simple matter.

FIGS. 6 and 7 illustrate one modified form of positioning means for adjusting the position of probe 13 in sewer 10. Indicated generally at 160 is a power-driven carriage which supports probe 13 for movement along the sewer. The carriage includes an elongated frame 162, on top of which is mounted a pair of laterally spaced cradling members 164 which support sections 28, 30 in housing 14. Holding the housing firmly against members 164 is a strap 166 which extend over the top of housing section 28, with opposite ends of the strap detachably fastened to members 164 through screws 168. Also mounted on frame 162, adjacent the right or forward end thereof in FIG. 6, is an upright support 170 which supports housing section 32. More specifically, support 170 includes a bore 172 which receives housing section 32.

The rear end of lug 52 extending from housing section 28 is supported against an upright plate 174 which is suitably secured to the top side of frame 162.

The left or rear end of frame 162 in FIG. 6 is supported for traveling along sewer 10 through a pair of laterally spaced endless treads 176. Each tread is supported on a set of spaced-apart rollers, such as rollers 178, 180 shown in FIG. 6. The rollers supporting the treads are suitably journaled on a subframe 182 mounted on the bottom side of frame 162. The treads ride on the inside surface of the wall of sewer 10, at an elevation (indicated at A) which is above the base of the wall.

Mounted on the top side of frame 162 directly above frame 182 is an enclosed casing 184 containing an electric motor 186 powered by a battery 188. Roller 180, and the corresponding roller on the far side of the carriage in FIG. 6, are drivingly connected to the output shaft of motor 186 through suitable drive means including a drive chain 190.

The forward end of frame 162 is supported for movement along the sewer through a ball 192 which is rotatably mounted through a shaft 194 on a subframe 196. Shaft 194 accommodates turning of ball 192 about a substantially horizontal axis in FIGS. 6 and 7. Subframe 196 is mounted on the bottom side of frame 162 through a swivel connection 198 which accommodates turning of subframe 196 about a substantially upright axis.

It will be noted that while treads 176, as previously mentioned, ride on the inside wall of sewer 10 at an elevation above the base of the wall, ball 192 is constructed to seek and ride along the base of the wall. Thus, ball 192, and the structure supporting it on frame 162, constitute lateral centering means herein which tends to maintain the forward end of frame 162 centered laterally in sewer 10. This is an important feature since it prevents the forward end of frame 162 from riding up on the wall of the sewer, which action might result in the carriage tipping over and becoming ineffective to transport probe 13.

Suitably attached to the rear end of frame 162 is a lug 200, to which is fastened the outer end of an elongated line shown partially at 202. Line 202 may extend to a point above the ground along a path similar to that shown for tape 20 in FIG. 1. As contemplated herein, line 202 is employed primarily for stopping forward movement of carriage 160, and also for retrieving the same, and therefore, need not possess the same stiffness as is required in tape 20.

The apparatus illustrated in FIGS. 6 and 7 for transporting probe 13 is particularly useful in a situation where there is little or no fluid flow in sewer 10.

Referring to FIGS. 8 and 9, these illustrate another modified form of positioning means constructed according to the invention. This modification has particular utility in supporting probe 13 for movement where there is a substantial amount of fluid flow in sewer 10.

Indicated generally at 204 is an inflated element, or flotation unit, supporting the probe. Element 204 includes an elongated base portion 206, and adjacent the left or rear end of portion 206 in FIG. 8 upwardly projecting ears 208 which cradle section 28, 30 in housing 14. Theses housing sections are secured in place by means of straps 210 which extend over the sections, with opposite ends of the straps releasably anchored to ears 208 through fasteners 212. Extending upwardly from the right or forward end of base 206 in FIG. 8 is a collar 214 including an opening 216 which freely receives and encompasses the forward end of housing section 32.

Shown at 218 in FIG. 8 is the outer end portion of an elongated line which is suitably fastened to lug 52. Line 218 may be similar to previously described line 202, and is employed for a similar purpose.

Explaining now how the apparatus described herein may be employed as contemplated by the invention, and considering the case where tape 20 is the positioning means used to adjust the position of probe 13, plug 72 may be inserted in socket 40 in the housing to energize transmitter 16. The probe may then be inserted in sewer 10 and advanced therealong by paying out tape 20.

To determine the location and course of the sewer underground, the transmitter may be stopped at a series of points spaced along the length of the sewer, and at each of such points, the position of the transmitter determined through manipulating receiver 24. More specifically, the following steps may be employed to determine the position of the transmitter at each of such points. With the transmitter stopped at a particular point, receiver 24 may be moved about over the ground in a region generally above the transmitter, and with antenna 26 occupying a substantially horizontal plane. Those skilled in the art will appreciate that through this procedure, and through simultaneously observing ammeter 144, it is possible to locate positions over the ground where null readings are obtained in the ammeter. Null readings occur where the disposition of the antenna relative to the transmitter is such that little or no signal is developed in the antenna and fed to amplifier 132. It will be further appreciated that such positions lie along a substantially straight path which occupies an upright plane extending through, and disposed at a right angle to the longitudinal axis of, coil 86 in the transmitter.

Next, with antenna 26 adjusted to occupy an upright plane, transmitter 24 may be advanced along the path containing the positions just located, with antenna 26 moving in a direction substantially normal to the upright plane that it occupies. Through this procedure, a peak current reading will be obtained in ammeter 144 on the receiver passing directly over the transmitter. With this information, it will then be known that the transmitter, and hence the portion of sewer immediately surrounding the transmitter, lies directly below a particular point on the ground.

To determine the depth of the transmitter, and hence of the sewer, the receiver may next be advanced along the same path just described, with antenna 26 in this case disposed at an angle of 45° both to the path and to an upright line intersecting the path. More specifically, beginning from the point on the ground directly over the transmitter, and with antenna 26 sloping upwardly and away from such point in the fashion just indicated, the transmitter may be moved away from the point along the path until a null reading is obtained in ammeter 144. Where such a reading is obtained, the antenna is then positioned at substantially the same distance from the point on the ground directly over the transmitter, as is such point spaced above the transmitter.

Through repeating the steps just described, it is apparent that the apparatus proposed herein can readily be employed to determine the course and location of sewer 10. Through similar steps, the apparatus can be used to determine such information about other types of nonmetallic conduits.

By listening to the audio tone produced by loudspeaker 142 in the receiver, one can easily determine when transmitter 16 moves past a metallic object of the type described earlier inside sewer 10. More specifically, as the transmitter moves to a position closely adjacent such an object, the inductance of coil 86 changes in a fashion lowering the frequency of the wave transmitted by the transmitter. When such action occurs, the frequency of the audio signal supplied by mixer 134 to amplifier 138 in the receiver increases, and hence the frequency of the audio tone produced by the speaker increases. Thus, mixer 134 is also referred to as an indicating means herein.

By stopping the transmitter at the location where the highest detectable audio frequency occurs, and through repeating the steps described above to determine the position of the transmitter, the position of the particular metallic object can easily be obtained.

Because of the novel construction proposed herein for coil 86, whereby the inductance of the coil is affected significantly only by metallic objects inside, and not by such objects outside, a conduit, the proposed apparatus detects only those metallic objects which are located within the conduit through which the transmitter moves. This is an important feature in the invention, particularly where the conduit being explored may lie closely adjacent other conduits which may be metallic.

The procedures just described may be employed with each of the modified forms of positioning means utilized to adjust the position of the transmitter inside a conduit.

It should be noted that the method of the invention may be practiced without transmitter 16 operating in a continuous fashion. More specifically, the invention may be practiced by energizing the transmitter at intervals as it moves along a pipe. While certain advantages of continuous-type operation may be lost in this kind of practice, other advantages, desirable in particular applications, may be obtained.

While a preferred embodiment and manner of practicing the invention have been described herein, and certain modifications indicated, it is appreciated that other variations and modifications are possible without departing from the spirit of the invention. Accordingly, it is desired to cover all such variations and modifications which would be apparent to one skilled in the art and that come within the scope of the appended claims.

I claim and desire to secure by Letters Patent:

1. A method of detecting the presence of a metallic object located within a pipe comprising through a source of electromagnetic energy disposed within the pipe, producing an electromagnetic wave in a magnetic field, about 80 percent of whose stored energy is within the outer boundaries of the pipe, and whose frequency is influenced appreciably by the proximity of the source to a metallic object inside the pipe, and nonappreciably by the proximity of the source to such an object outside the pipe, transmitting the wave, through radiating the same, to a region outside the pipe, and from a position outside the pipe, observing any changes in the frequency of the wave transmitted to said region with changes in the location of the source an an indication of the presence of the metallic object.

2. Apparatus for exploring an elongated pipe comprising a transmitter adapted to be received for free movement within the pipe operable when energized to produce a magnetic field having about 80 percent of its stored energy disposed within the boundaries of the pipe, and within such field a variable-frequency periodic electromagnetic wave which radiates to a region outside the pipe, the frequency of said wave being influenced appreciably by the proximity of the transmitter to a metallic object inside the pipe, and nonappreciably by the proximity of the transmitter to such an object outside the pipe, and a receiver located outside the pipe adapted to receive a wave transmitted to said region, said receiver including a source operable to produce another wave having a substantially fixed frequency, and indicating means constructed to indicate any change in the frequency of the first-mentioned wave through comparing the frequencies of said first and second-mentioned waves.

3. Apparatus for exploring an elongated pipe comprising a transmitter adapted to be received for free movement within the pipe, operable when inside the pipe and energized to produce and transmit through radiation to a region outside the pipe a periodic electromagnetic wave, with production of such a wave accompanied by production of a magnetic field which contains about 80 percent of its stored energy within a zone disposed inside the outside surface of the pipe, with the frequency of said wave being influenced appreciably by the proximity of the transmitter to a metallic object inside the pipe, and nonappreciably by the proximity of the transmitter to such an object outside the pipe, and a receiver located outside the pipe adapted to receive a wave transmitted to said region, said receiver being constructed to indicate an appreciable change in the frequency of said wave.